Nov. 11, 1969     L. HALL ET AL     3,477,538
ELECTRIC PROPULSION MOTOR VEHICLE

Filed Jan. 22, 1968     3 Sheets-Sheet 1

LESLIE HALL
ARTHUR E. LYNES
INVENTORS

ATTORNEYS

LESLIE HALL
ARTHUR E. LYNES
INVENTORS

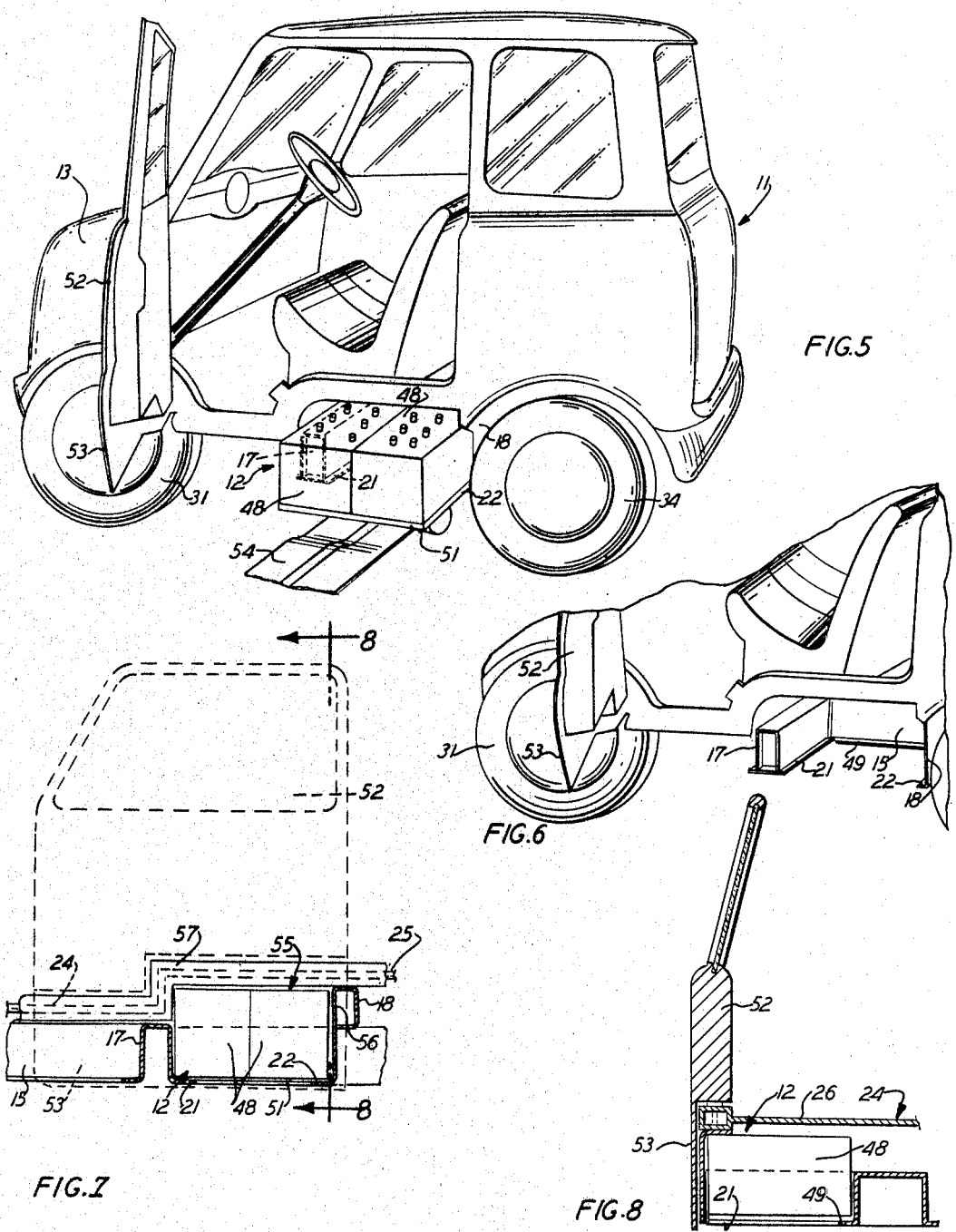

United States Patent Office 3,477,538
Patented Nov. 11, 1969

3,477,538
ELECTRIC PROPULSION MOTOR VEHICLE
Leslie Hall, Hadleigh, and Arthur E. Lynes, Thorpe Bay, England, assignors to Ford Motor Company, Dearborn, Mich., a corporation of Delaware
Filed Jan. 22, 1968, Ser. No. 699,701
Claims priority, application Great Britain, Apr. 12, 1967, 16,781/67, 16,782/67, 16,784/67, 16,786/67
Int. Cl. B60k 1/00; B61c 3/00
U.S. Cl. 180—65                                    3 Claims

ABSTRACT OF THE DISCLOSURE

A motor vehicle in which the vehicle body is supported on a frame comprising a central backbone having outriggers projecting therefrom. The frame supports at least one prime mover in the form of an electric motor and the electric energy producing power cells for supplying current to the motor are located between and supported by the outriggers.

BACKGROUND OF THE INVENTION

Electrically propelled vehicles for many years have not been able to compete in the passenger and commercial vehicle market with vehicles utilizing internal combustion engines as the prime mover. The use of electric propulsion has been substantially limited to golf carts and to material handling equipment used primarily within the confines of warehouses and factories. Recent emphasis on smog control in congested urban areas has revived engineering interest in electric propulsion since the latter does not have the exhaust emission problems inherent in internal combustion engines.

The range that an electrically propelled vehicle can travel is directly related to its battery capacity and the drain on the battery capacity is related to the weight of the vehicle, including the batteries, that must be propelled. Yet the vehicle must be of a size large enough to comfortably carry the passengers and an optimum amount of cargo such as luggage, merchandise and sporting equipment.

Accordingly, it is an object of the present invention to provide a motor vehicle adapted to utilize electric motor propulsion and yet having a disposition and arrangement of the body structure that enables optimum internal dimensions to be obtained for prescribed external dimensions of the vehicle.

SUMMARY OF THE INVENTION

A motor vehicle according to the present invention comprises a vehicle body, passenger seats, and doors providing for egress from and ingress to the interior of the vehicle body. The vehicle body is mounted on a frame comprising a central backbone and outriggers projecting transversely therefrom. At least one electric motor is supported on the frame and is coupled to the drive wheels of the vehicle for propelling the latter. Electric energy producing power cells are provided for supplying current to the motor. The power cells are located between and supported by a pair of parallel outriggers.

DESCRIPTION OF THE DRAWING

Other objects, advantages and features of the present invention will be made more apparent as this description proceeds, reference being had to the accompanying drawings, wherein:

FIG. 5 is a perspective side view of the vehicle with the door open;

FIG. 6 is a view in part similar to FIG. 5 but with the power cells removed;

FIG. 7 is a side view in part diagrammatic illustrating the manner in which the vehicle door overlaps the battery storage compartment when in closed position; and FIG. 8 is a view in part sectional taken on the line 8—8 of FIG. 7.

DESCRIPTION

Figure 1:
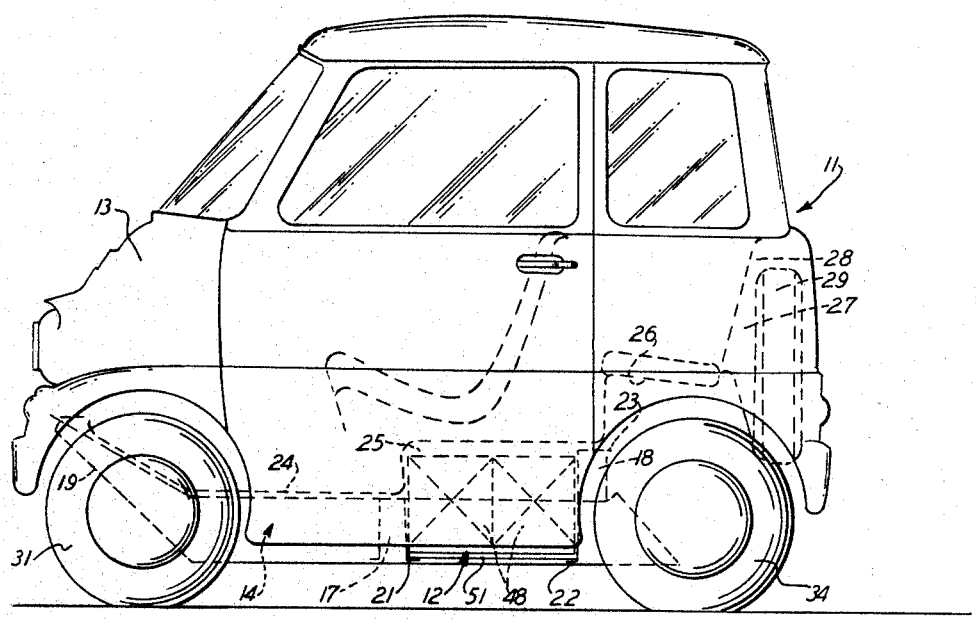
FIG. 1 is a diagrammatic side view of a motor vehicle according to the present invention.
Figure 2:
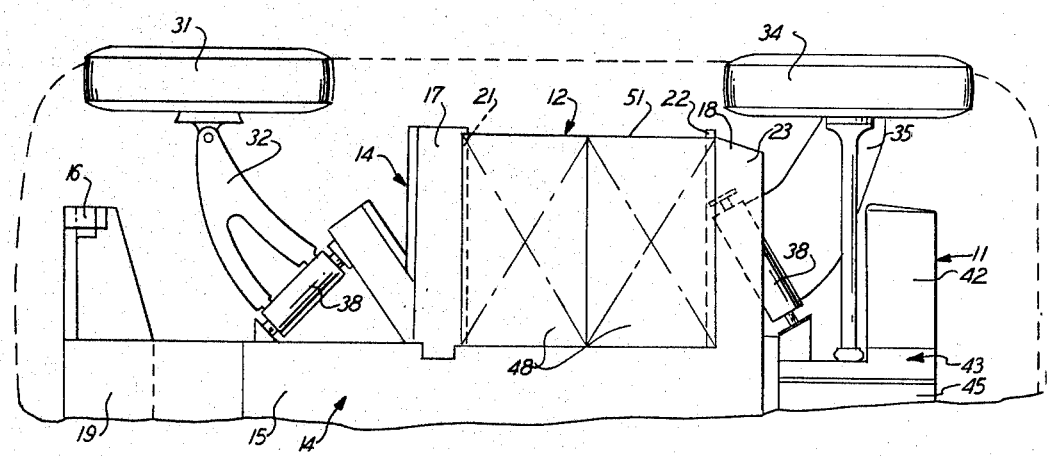
FIG. 2 is a diagrammatic plan elevation of the chassis and running gear of the vehicle.
Figure 3:
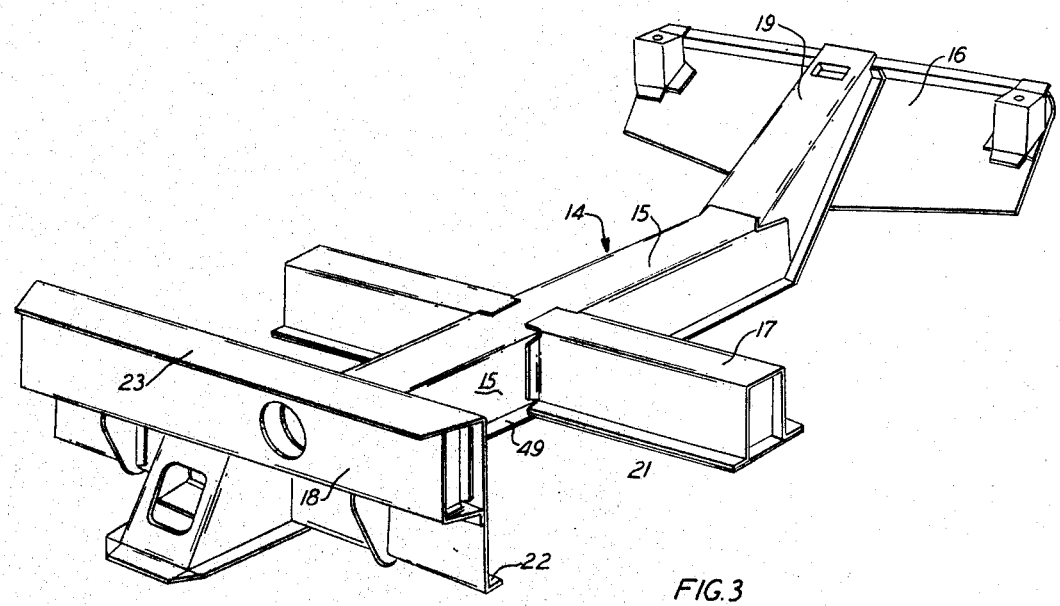
FIG. 3 is a perspective view of the frame of the vehicle.

Referring now to the drawings, the vehicle, generally designated 11 in FIG. 1, is adapted to be driven by electric motors supplied by electric energy producing power cells 12 which may be electric storage batteries or fuel cells. The vehicle comprises a body 13, which may be made of glass reinforced plastic, and a frame 14, see FIGS. 2 and 3.

The frame 14 is made of sheet metal welded together. This frame 14 has a central backbone 15 from which front, central and rear outriggers 16, 17 and 18, repectively, project transversely. The front end 19 of the backbone 15 is inclined upwardly and the front outrigger 16 projects from the front end of this backbone portion; the central outrigger 17 has a lower flange 21 in the same plane as the lower surface of the backbone; and the rear outrigger 18 has a lower flange 22 in the same plane as the lower surface of the backbone 15 and an upper flange 23.

The body 13 is bolted in six places to the outrigger. The floor 24 of the body 13 has a first raised part 25 which extends from the central outrigger 17 to the rear outrigger 18, and a second raised part 26 which is at a higher level than the part 25 and which extends rearwardly from the part 25. A cushion 27 on the second raised part 26 of the body forms a rear seat. Behind the back rest 28 of the rear seat there is storage room for a spare tire 29.

Figure 4:
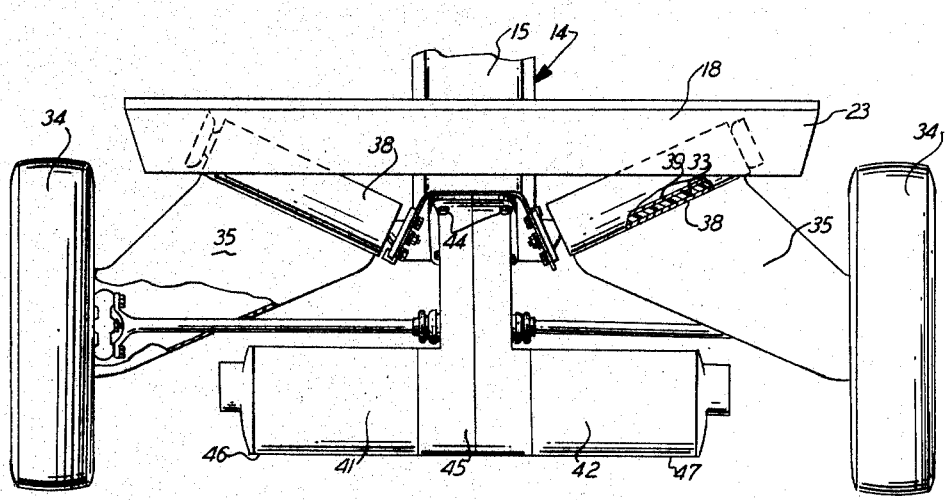
FIG. 4 is a plan view of the transmission and motor arrangement of the vehicle.

The wheels of the vehicle are each independently sprung. The front wheels 31 are each carried by a leading wheel control arm 32 which is pivotally connected between the backbone and front outrigger 17, and the pivotal axis is inclined to the longitudinal line of the vehicle. In order to save space the springs 33 are torsion springs, and the axis of the torsion springs are respectively coaxial with the pivotal axis of the leading arms 32. Each torsion spring 33 is preferably a rubber bushing of the kind used in the rear suspension shown in FIG. 4. The rear wheels 34 are each carried by a trailing arm 35 pivotally connected between the rear outrigger 18 and a part of the backbone to the rear of the outrigger; and the pivotal axis is inclined to the longitudinal line of the vehicle. As with the front suspension, the rear suspension has torsion springs 36, and the axes of the torsion springs are respectively coaxial with the pivotal axis of the trailing arms. The torsion springs are each a rubber bushing 37 bonded to an outer sleeve 38 and an inner cylinder 39. The outer sleeve 38 is fixed to the trailing arm 35, and the inner cylinder 39 is bolted to the rear outrigger 18 and backbone 15.

The rear wheels are driven by a pair of electric motors 41 and 42, each motor driving its own wheel. The motors 41 and 42 form with a final drive assembly 43 a rigid unit, and the unit is attached by bolts 44 to the rear end of the backbone 15. The unit comprises a casing 46 for the final drive assemblies, and housings 46 and 47 of the motors. The casing 46 and the two housings 46 and 47 are secured together by bolts (not shown) to form the unit. The axes of the motors are coaxial and parallel with the axes of the rear wheels.

The motors 41 and 42 are supplied with electric current from electric energy producing power cells. In the vehicle shown, the power cells comprise four lead acid batteries 48 mounted in pairs on each side of the backbone, though these may of course be replaced by fuel cells if and when the latter become available. The backbone 15 has a flange 49 which lies in the same plane as the flanges 21 and 22 on the outriggers 17 and 18. The two batteries located on one side of the backbone are supported on a tray 51 (FIG. 5), and the tray 51 is supported on the flanges 21, 22 and 49 on the outriggers and backbone. The batteries, as can be seen from FIGS. 1 and 5, are located in the space beneath the raised part 25 of the vehicle floor 24. The batteries on the other side of the vehicle are similarly supported.

The weight of the batteries tend to hold the tray in position on the flanges. As a safeguard, however, and as an anti-theft arrangement, each front door 52 has a lower flange 53 which extends downwardly to just below the flanges 21, 22, and 49. When the doors are closed, the flanges 53 close the gaps between the outriggers 17 and 18, and thus prevent the trays 51 from being removed.

The opening 55 between the outriggers 17 and 18 is normally closed by a panel 56 which is held in position by screws which pass through the base 57 of the door frame of the vehicle body 13.

This arrangement also enables the batteries to be readily removed. The front doors are first opened, the panel 56 is removed, and a wheeled jack 54 (FIG. 5) of a kind commonly found in garages is moved under the battery tray 51. The jack is then actuated to lift the tray 51 off the flanges 21, 22 and 49 and is then pulled to move the tray 51 carrying the batteries clear of the vehicle. Batteries are replaced in the vehicle in the same way.

The type of suspension used, the location of the batteries, the configuration of the floor, and the location of the motors and transmission all contribute to obtaining large internal dimensions in relation to the over-all dimensions of the vehicle. The arrangement of the batteries facilitates removal of the batteries for recharging.

We claim:
1. In a motor vehicle having a vehicle body, passenger seats, and doors providing for egress from and ingress to the interior of said vehicle body,
   a frame comprising a central backbone and parallel outriggers projecting transversely therefrom,
   the adjacent sides of the outriggers having opposed flanges,
   at least one electric motor supported on said frame coupled to the drive wheels of the vehicle for propelling the same,
   electric energy producing power cells for supplying current to said motor,
   and a tray means supported on said flanges between a pair of parallel outriggers,
   said power cells being carried by the tray means,
   the lower edge of a door when closed extending across the outboard ends of the outriggers carrying the power cell tray means to block horizontal withdrawal of the latter from the outrigger flanges.

2. A motor vehicle according to claim 1 in which:
   the motor and a final drive unit are bolted to the rear end of the backbone.

3. In a motor vehicle having road wheels, a vehicle body, a frame beneath said body, passenger seats, and doors for egress from and ingress to the interior of the vehicle body:
   the frame comprises central backbone and parallel outriggers projecting transversely therefrom,
   the adjacent sides of the outriggers have opposed flanges;
   the passenger seats comprise front and rear seats;
   the floor in front of the front seat is lower than the floor in front of the rear seat;
   and the rear seat is at a higher level than the front seat;
   at least one electric energy producing power cell for providing a source of electric power located below the floor in front of the front seat;
   a tray means supported on said flanges between a pair of parallel outriggers on which said power cell is carried,
   a propulsion unit for propelling the rear wheels of the vehicle is bolted to the rear end of the backbone;
   said propulsion unit comprising an electric motor connected to the source of electric power and a final gear drive mechanism for transferring power from the motor to the wheels;
   suspension arms extending between the frame and the rear road wheels control the movement of the latter;
   the electric motor afnd suspension arms being located below the level of the rear seat cushion and to the rear of the battery;
   and the lower edge of a door when closed extends across the outboard ends of the outriggers carrying the power cell tray means and blocks horizontal movement of the latter from the flanges.

References Cited

UNITED STATES PATENTS

| 629,079 | 7/1899 | Hunter | 180—65 |
| 1,551,594 | 9/1925 | Walter | 180—65 |

FOREIGN PATENTS

| 815,498 | 4/1937 | France. |
| 972,365 | 8/1950 | France. |
| 1,011,256 | 4/1952 | France. |

LEO FRIAGLIA, Primary Examiner

M. L. SMITH, Assistant Examiner

U.S. Cl. X.R.

105—51